(12) United States Patent
Liu et al.

(10) Patent No.: US 8,756,370 B1
(45) Date of Patent: Jun. 17, 2014

(54) NON-DISRUPTIVE DRIVE FIRMWARE UPGRADES

(75) Inventors: Zhiqi Liu, Hopkinton, MA (US); Lili Chen, Hopkinton, MA (US); Ashok Tamilarasan, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 309 days.

(21) Appl. No.: 12/888,943

(22) Filed: Sep. 23, 2010

(51) Int. Cl.
*G06F 12/00* (2006.01)
(52) U.S. Cl.
USPC .......................................... 711/114; 711/170
(58) Field of Classification Search
None
See application file for complete search history.

(56) References Cited

U.S. PATENT DOCUMENTS

| | | | |
|---|---|---|---|
| 7,389,379 B1* | 6/2008 | Goel et al. | 711/112 |
| 2008/0168434 A1* | 7/2008 | Gee et al. | 717/173 |

* cited by examiner

*Primary Examiner* — Shawn X Gu
(74) *Attorney, Agent, or Firm* — Krishnendu Gupta; Joseph D'Angelo

(57) ABSTRACT

A method, system, and computer program product for use in upgrading disk drive firmware in a data storage environment, comprising selecting a first physical disk from a set of physical disks, the first physical disk having firmware; wherein the physical disks are mapped to a set of logical disks, wherein the mapping of the physical disks to the set of logical disks includes a RAID system, removing the first physical disk, wherein based on the RAID system, removal of the first physical disk is transparent to I/O to the set of logical disks, and upgrading the firmware of the first physical disk while allowing I/O access to the set of logical disks.

15 Claims, 15 Drawing Sheets

NON-DISRUPTIVE DRIVE FIRMWARE UPGRADES

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application generally relates to firmware upgrades.

BACKGROUND

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

RAID (Redundant Array of Independent or Inexpensive Disks) parity schemes may be utilized to provide error detection during the transfer and retrieval of data across a storage system (also known as storage arrays or arrays).

In the industry there have become defined several levels of RAID systems. The first level, RAID-0, combines two or more drives to create a larger virtual disk. In a dual drive RAID-0 system one disk contains the low numbered sectors or blocks and the other disk contains the high numbered sectors or blocks, forming one complete storage space. RAID-0 systems generally interleave the sectors of the virtual disk across the component drives, thereby improving the bandwidth of the combined virtual disk. Interleaving the data in that fashion is referred to as striping. RAID-0 systems provide no redundancy of data, so if a drive fails or data becomes corrupted, no recovery is possible short of backups made prior to the failure.

RAID-1 systems include one or more disks that provide redundancy of the virtual disk. One disk is required to contain the data of the virtual disk, as if it were the only disk of the array. One or more additional disks contain the same data as the first disk, providing a "mirror" of the data of the virtual disk. A RAID-1 system will contain at least two disks, the virtual disk being the size of the smallest of the component disks. A disadvantage of RAID-1 systems is that a write operation must be performed for each mirror disk, reducing the bandwidth of the overall array. In a dual drive RAID-1 system, the first disk and the second disk contain the same sectors or blocks, each disk holding exactly the same data.

RAID-2 systems provide for error correction through hamming codes. The component drives each contain a particular bit of a word, or an error correction bit of that word. RAID-2 systems automatically and transparently detect and correct single-bit defects, or single drive failures, while the array is running. Although RAID-2 systems improve the reliability of the array over other RAID types, they are less popular than some other systems due to the expense of the additional drives, and redundant onboard hardware error correction.

RAID-4 systems are similar to RAID-0 systems, in that data is striped over multiple drives. For example, the storage spaces of two disks are added together in interleaved fashion, while a third disk contains the parity of the first two disks. RAID-4 systems are unique in that they include an additional disk containing parity. For each byte of data at the same position on the striped drives, parity is computed over the bytes of all the drives and stored to the parity disk. The XOR operation is used to compute parity, providing a fast and symmetric operation that can regenerate the data of a single drive, given that the data of the remaining drives remains intact. RAID-3 systems are essentially RAID-4 systems with the data striped at byte boundaries, and for that reason RAID-3 systems are generally slower than RAID-4 systems in most applications. RAID-4 and RAID-3 systems therefore are useful to provide virtual disks with redundancy, and additionally to provide large virtual drives, both with only one additional disk drive for the parity information. They have the disadvantage that the data throughput is limited by the throughput of the drive containing the parity information, which must be accessed for every read and write operation to the array.

RAID-5 systems are similar to RAID-4 systems, with the difference that the parity information is striped over all the disks with the data. For example, first, second, and third disks may each contain data and parity in interleaved fashion. Distributing the parity data generally increases the throughput of the array as compared to a RAID-4 system. RAID-5 systems may continue to operate though one of the disks has failed. RAID-6 systems are like RAID-5 systems, except that dual parity is kept to provide for normal operation if up to the failure of two drives.

Combinations of RAID systems are also possible. For example, a four disk RAID 1+0 system provides a concatenated file system that is also redundant. The first and second disks are mirrored, as are the third and fourth disks. The combination of the mirrored sets forms a storage space that is twice the size of one individual drive, assuming that all four are of equal size. Many other combinations of RAID systems are possible.

In at least some cases, when a logical volume is configured so that its data is written across multiple disk drives in the striping technique, the logical volume is operating in RAID-0 mode. Alternatively, if the logical volume's parity information is stored on one disk drive and its data is striped across multiple other disk drives, the logical volume is operating in RAID-3 mode. If both data and parity information are striped across multiple disk drives, the logical volume is operating in RAID-5 mode.

In a common implementation, a Storage Area Network (SAN) is used to connect computing devices with a large number of storage devices. Management and modeling programs may be used to manage these complex computing environments.

Storage Management Initiative Specification (SMI-S), and Common Information Model (CIM) technologies, are widely used for managing storage devices and storage environments. CIM is described further below. The SMI-S is a standard management interface that allows different classes of hardware and software products to interoperate for monitoring and controlling resources. For example, the SMI-S permits storage management systems to identify, classify, monitor, and control physical and logical resources in a SAN. The SMI-S is based on CIM, and Web-Based Enterprise Management (WBEM) architecture. CIM is a model for describing management information, and WBEM is an architecture for using Internet technologies to manage systems and networks. The SMI-S uses CIM to define objects that represent storage entities such as Logical Unit Numbers (LUNs), disks, storage subsystems, switches, and hosts. (In many, but not all cases, the term "volume" or "logical volume" is interchangeable with the term "LUN".) CIM also defines the associations that may or may not exist between these objects, such as a disk being associated to a storage subsystem because it physically resides in the storage subsystem.

The CIM objects mentioned above may be managed by a CIM object manager (CIMOM). A storage management software application can use a CIM client to connect to a CIMOM, to retrieve information about the storage entities that the CIMOM manages, and also to perform active configuration of the storage entities. Storage management software that uses a CIM client may be called a CIM client application.

For example, SMI-S describes how a current storage LUN is mapped. A CIM server is a CIMOM and a set of CIM providers. The SMI-S describes several methods for assigning a LUN from a disk storage system to a host, or for adding a LUN to a disk storage system.

For example, the SMI-S describes how to add a LUN to a disk storage system, wherein the method CreateOrModifyElementFromStoragePool( ) in the StorageConfigurationService object is used to create a LUN (or storage volume) given the LUN type, the size of the LUN, a storage pool CIM object path and the StorageConfigurationService. The resulting LUN can then be assigned to a host or several hosts available to the disk storage system.

Developing and unifying management standards for desktop, enterprise and Internet environments is a main goal of the Distributed Management Task Force Inc. (DMTF). DMTF standards are platform-independent and technology neutral, and facilitate cost effective system management. The DMTF's CIM standard is an object-oriented management information model that unifies and extends existing management standards, such as for example, Simple Network Management Protocol (SNMP), Desktop Management Interface (DMI), and Common Management Information Protocol (CMIP). The CIM specification defines the syntax and rules of the model and how CIM can be integrated with other management models, while the CIM schema comprises the descriptions of the models.

The CIM standard schema may define thousands of classes with properties and associations for logical and physical modeling. The schema may represent one or many components of an information handling system including, but not limited to, fans, power supplies, processors, and firmware. The CIM schema class definitions also include methods. Organization of the classes is accomplished by use of namespaces, which function as logical databases. DMTF Profiles are specifications that define the CIM model and associated behavior for a management domain. The profiles define requirements regarding the classes and associations used to represent the management information in a given management domain. Generally, within a CIMOM, profiles are implemented by different providers in one or more namespaces. The CIMOM provides an interface, which allows a provider to expose the instances of CIM classes and a client application to read and/or write properties and invoke methods.

Many of the CIM methods include management tasks, such as, for example but not limited to, updates and diagnostics. Many of the methods and tasks/jobs may require a long period of time in order to be completed. As used herein, the words "task" and "job" may be used interchangeably. In a CIM environment, a provider may return a job handle to a client using the "Job" output parameter on the invoked CIM method, thereby effectively making the invocation asynchronous. The job handle may be represented by a CIM reference to an instance of a CIM class arbitrarily named CIM_ConcreteJob. The reference may be used at any time by a client to request an actual instance of CIM_ConcreteJob, and to check the status of a job.

In general, tasks such as assigning a LUN from a disk storage system to a host, and adding a LUN to a disk storage system, can be complex to execute. Other example tasks may include otherwise allocating storage, specifying the logical and/or physical devices used for the storage allocation, specifying whether the data should be replicated, the particular RAID level, and the like.

SUMMARY OF THE INVENTION

A method, system, and computer program product for use in upgrading disk drive firmware in a data storage environment, the method comprising selecting a first physical disk from a set of physical disks, the first physical disk having firmware; wherein the physical disks are mapped to a set of logical disks, wherein the mapping of the physical disks to the set of logical disks includes a RAID system, removing the first physical disk, wherein based on the RAID system, removal of the first physical disk is transparent to I/O to the set of logical disks, and upgrading the firmware of the first physical disk while allowing I/O access to the set of logical disks.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
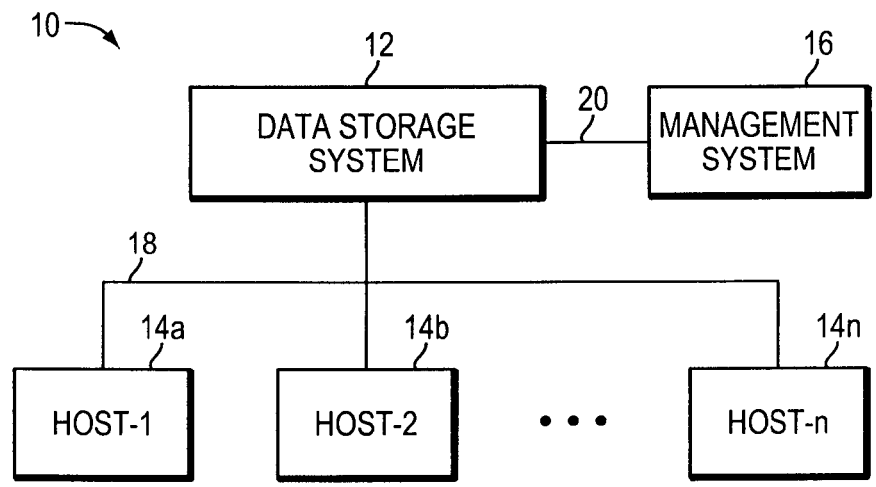
FIG. 1 is an example of an embodiment of a system that may utilize the techniques described herein.

Conventionally, traditional storage system management software requires storage administrators to manually perform a set of discrete operations to accomplish array management tasks. Typically, the firmware on the drives used for storage is updated when new firmware updates are available. Conventionally, when upgrading the firmware, host I/O accessibility is not maintained. Traditionally, it would be necessary to schedule maintenance cycles during which hosts connected to this array with the firmware being upgraded would be shut down. In addition, conventionally the array would need to re-boot multiple times so that the new firmware information can be retrieved after the reboot. Typically, the whole process for drive firmware upgrade would require at least 30-minutes of system down time. As well, in a typical upgrade, if the firmware upgrade was bad, the whole array may be taken offline which may result in data loss or data unavailability. Previously, firmware may not have been needed to be updated frequently. Currently, the firmware may need to be updated on a monthly or more frequent basis. Generally, 30 minutes of downtime may be unacceptable.

In an embodiment of the current techniques, firmware upgrades are enabled that do not require an array to be shut down. In an embodiment of the current techniques, firmware may be updated on a drive of the array of drives while I/O is still being performed to the array. In some embodiments, the firmware update may be transparent to a user or host accessing the array. In other embodiments of the current techniques, the array or storage system may not need to be rebooted. In further embodiments, the firmware may be updated on each drive in the array without any downtime of the array or information on the array.

In certain embodiments, the current techniques may select a drive of the array of drives, put the drive in an offline or probational state and upgrade the firmware on the drive. In some embodiments, a fault code may be sent to the drive to place it in the probational state. In certain embodiments, the other drives of the array, may satisfy the I/Os that would have otherwise been directed to this drive. In certain embodiments, this may be because RAID may enable one or more of the disks of an array to be offline, but may still be able to satisfy all the I/O to the inaccessible disk by using the redundant information on another of the RAID disks. In further embodiments, the firmware upgrade may be performed while the drive is in the probational state.

In some embodiments, the process of upgrading the drives in a RAID group may be performed sequentially on each drive of a RAID group. In certain embodiments, upgrades of drives of different RAID groups may be performed in parallel. In further embodiments, drives of different RAID groups may be performed in parallel while each drive within that RAID group may be performed sequentially. In at least some embodiments, each upgrade may be completed while still satisfying all I/O to the RAID group or groups having a drive with its firmware being updated.

Consider a particular embodiment of the current techniques. In this embodiment the firmware of each drive may be updated. In this embodiment, a failure may be sent to a drive to place it in a probational state. In this embodiment, the firmware may be upgraded while the drive is in the probational state. In this embodiment, during firmware upgrade period for the drive, no commands may be sent to the drive. This may mean that the drive may not be able to service any I/O for up-to 90 seconds. In this embodiment, the other drives of the RAID group may satisfy all I/O while the drive is being upgraded.

In an embodiment of the current techniques a RAID group may be selected. In this embodiment, a drive from the RAID Group may selected. The drive may be put it into probational state. By utilizing probational logging, the LUNs on the RAID Group can continue to service I/O without any disruption even while the drive is being upgraded. The firmware on the drive may be updated. Once the firmware has been updated and the drive had been tested, the drive may be taken out of probational state.

Consider now an alternative embodiment of the current techniques. In this embodiment, the firmware is updated in a number of single drives of a number of RAID groups in parallel. In this embodiment, multiple drive, each selected from a different RAID groups may be updated at the same time so that only one drive may have its firmware updated per RAID group at a given time. Consider now a further embodiment of the current techniques. In this embodiment, the firmware is sequentially upgraded on each drive within the RAID group. Now further consider yet a further the embodiment of the current techniques, where the firmware is sequentially upgraded on drives in different RAID groups in parallel.

Referring to the embodiment of FIG. 1, shown is an example of an embodiment of a computer system that may be used in connection with performing the technique described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring and provisioning the data storage for use by the hosts in connection with techniques described herein. As an example that may executed on the hosts 14a-14n, the data storage configuration and provisioning tasks may include allocating storage for user accounts or mailboxes, specifying the devices (logical and/or physical) used to store the email data, specifying whether data replication is performed for disaster recovery, configuring the physical devices in one or more RAID groups and other logical entities, and the like. Techniques that may be used in connection with performing data storage configuration, and configuration and provisioning tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the technique as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes. Data storage devices may also be configured using other logical device layers on top of the LV or LUN which are then exposed to the host or other component using the configured data storage.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Figure 2:
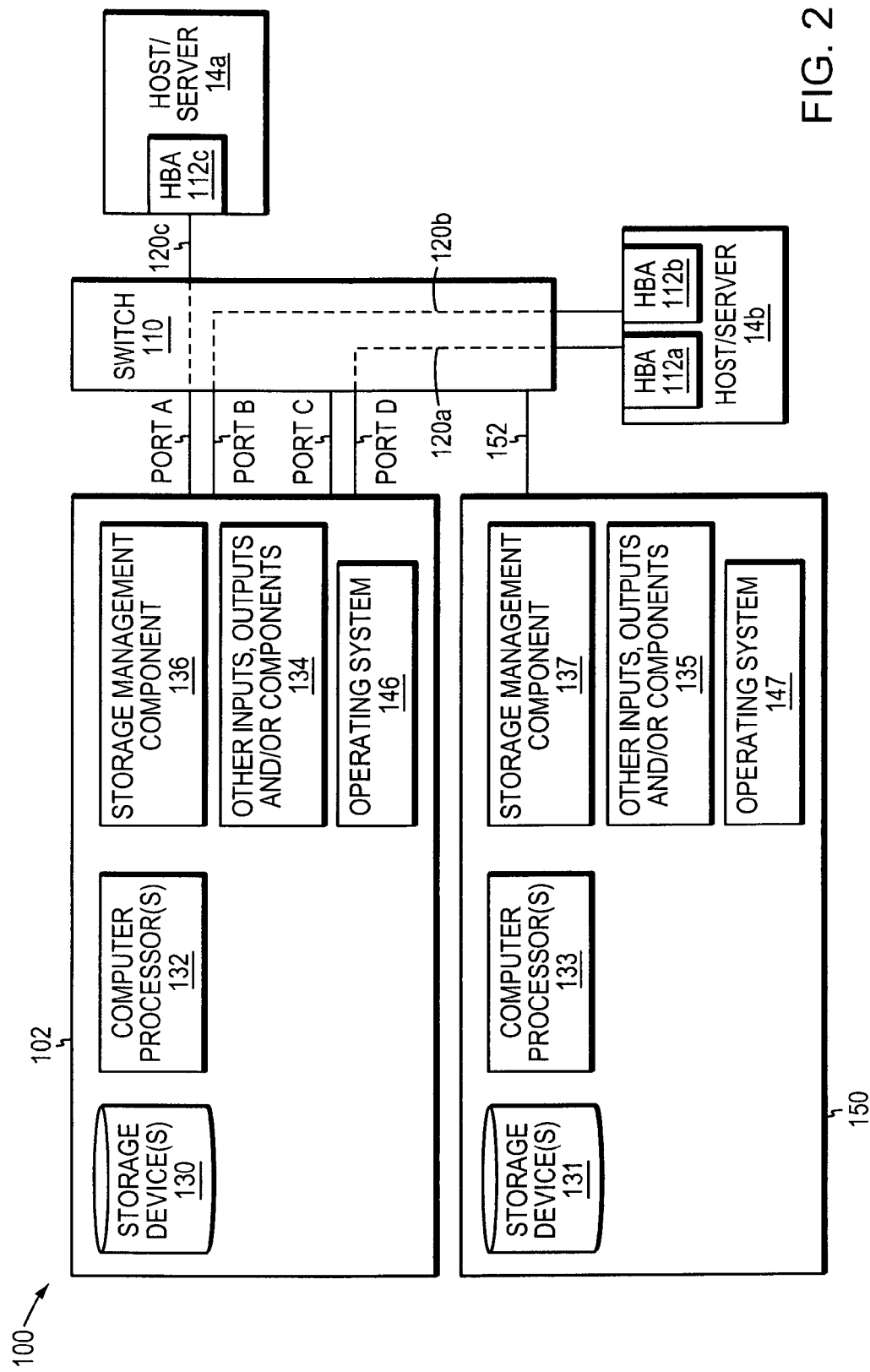
FIG. 2 is an alternative example of an embodiment of a system that may utilize the techniques described herein.

Referring now to FIG. 2, shown is an example 100 of components that may be used in connection with the current techniques. The example 100 may represent components illustrated in connection of FIG. 1 configured in a storage area network (SAN). Included in the example 100 are data storage systems 102 and 150, a switch 110, and hosts or servers 14a and 14b. The switch 110 may be used in connection with facilitating communications between each of the hosts 14a and 14b and the data storage systems 102 and 150. Communications between a host and the data storage system 102 may be defined in terms of a path. Host 14a communicates with the data storage system 102 over a path designated as 120c. Path 120c is formed by the starting point, the HBA or host bus adapter 112c and the ending point, port A of the receiving data storage system 102. Host 14b communicates with the data storage system 102 over two paths designated as 120a and 120b. Path 120a is formed by the starting point, the HBA 112a, and the ending point, port d of the receiving data storage system 102. Path 120b is formed by the starting point, the HBA 112b, and the ending point, port b of the receiving data storage system 102. It should be noted that different HBAs from the same or different hosts may also communicate with the data storage system through a same port of the data storage system although each path 112a, 112b, and 112c use a different port. An embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. As also known to those skilled in the art, various networking technologies that may be used in an embodiment make use of WWNs.

Each HBA may include one or more ports although in the example illustrated, each HBA has only a single port. As represented with element 152, connections between the hosts using switch 110 may be made with respect to data storage system 150. Although only two data storage system are illustrated for purposes of simplicity in illustration, each of the hosts may have connections to other data storage systems in the SAN. Additionally, each host may be connected to the data storage systems 102, 150 using other connections, including direct cabling, than as illustrated in FIG. 2.

The data storage systems 102, 150 are illustrated as each including one or more storage devices 130, 131, one or more computer processors 132, 133, an operating system 146, 147, a storage management component 136, 137, and other inputs, outputs and/or components 134, 135, which may include all or some of other logic described below.

An example of an embodiment of the data storage system 102 is the CLARiiON™ data storage system by EMC Corporation which includes two computer processors as represented by the element 132 although an embodiment may include a different number of processors for use in connection with the storage mapping technique described herein.

The one or more storage devices 130 may represent one or more physical devices, such as disk drives, that may be accessed in logical units (e.g., as LUNs) as described elsewhere herein. The operating system 146 may be any one of a variety of commercially available, proprietary, or other operating system capable of execution by the one or more computer processors 132 in accordance with the particulars of the data storage system 102.

As used herein, the term network storage refers generally to storage systems and storage array technology, including storage area network (SAN) implementations, network attached storage (NAS) implementations, and other storage architectures that provide a level of virtualization for underlying physical units of storage. In general, such storage architectures provide a useful mechanism for sharing storage resources amongst computational systems. In some cases, computational systems that share storage resources may be organized as a coordinated system (e.g., as a cluster or cooperatively managed pool of computational resources or virtualization systems). For example, in a failover cluster it may be desirable to share (or at least failover) virtual machine access to some storage units.

For concreteness, embodiments are described which are based on facilities, terminology and operations typical of certain processor architectures and systems, and based on terminology typical of certain operating systems, virtualization systems, storage systems and network protocols and/or services. That said, the embodiments are general to a wide variety of processor and system architectures (including both single and multi-processor architectures based on any of a variety of instruction set architectures), to numerous operating system implementations and to systems in which both conventional and virtualized hardware may be provided. As described herein, the embodiments are also general to a variety of storage architectures, including storage virtualization systems such as those based on storage area network (SAN) or network attached storage (NAS) technologies.

Accordingly, in view of the foregoing and without limitation on the range of underlying processor, hardware or system architectures, operating systems, storage architectures or virtualization techniques that may be used in embodiments of the storage mapping technique are described. Based on these descriptions, and on the claims that follow, persons of ordinary skill in the art will appreciate a broad range of suitable embodiments. As used herein in FIGS. 3b, 4-9, the RAID groups may be example implementations of the storage devices 130, 131 of FIG. 2.

Figure 3B:
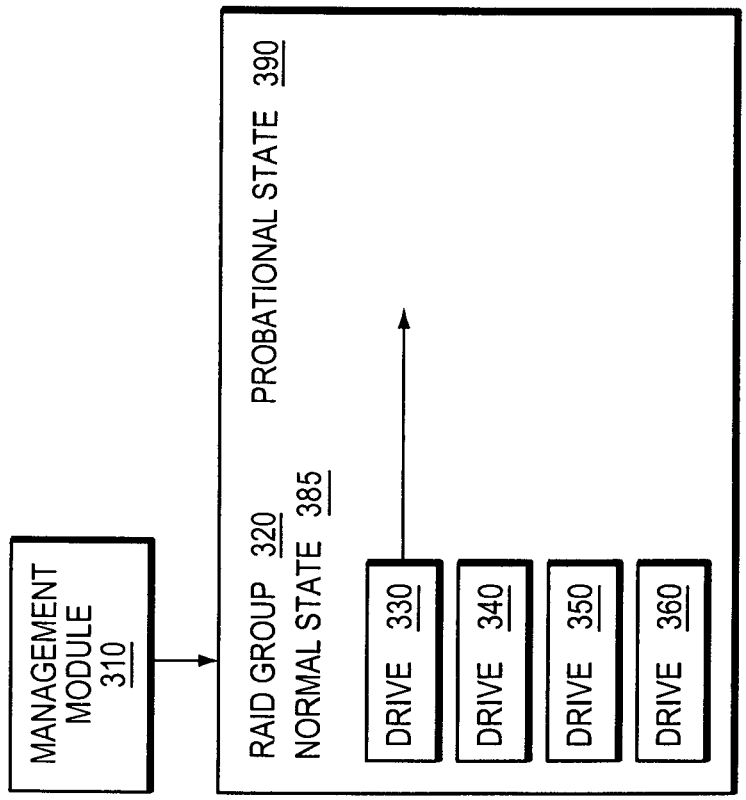
FIG. 3b is an example of an embodiment of a RAID group that may utilize the techniques described herein.

Refer now to the simplified embodiments of FIGS. 3a, 3b, and 4-8. In FIG. 3b there is management module 310 or storage management component, a RAID Group 320 and 4 dives 330-360. In FIG. 3b there is a normal state 385 and a probational state 390. In FIG. 3b, all drives are in the normal state. As used in FIG. 3b and in the other Figures, any type of RAID may be running on the RAID group. A particular example is provided for clarity, however it is realized that the RAID group may be running any RAID implementation that allows a drive to be taken offline while still satisfying all I/O to the logical volume or volumes represented by that RAID group.

Figure 3A:
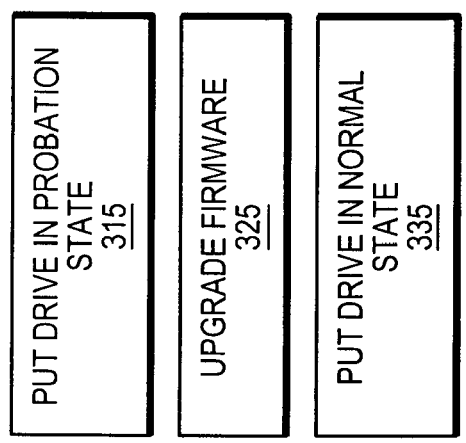
FIG. 3a is an example of an embodiment of a method that may utilize the techniques described herein.
Figure 4:
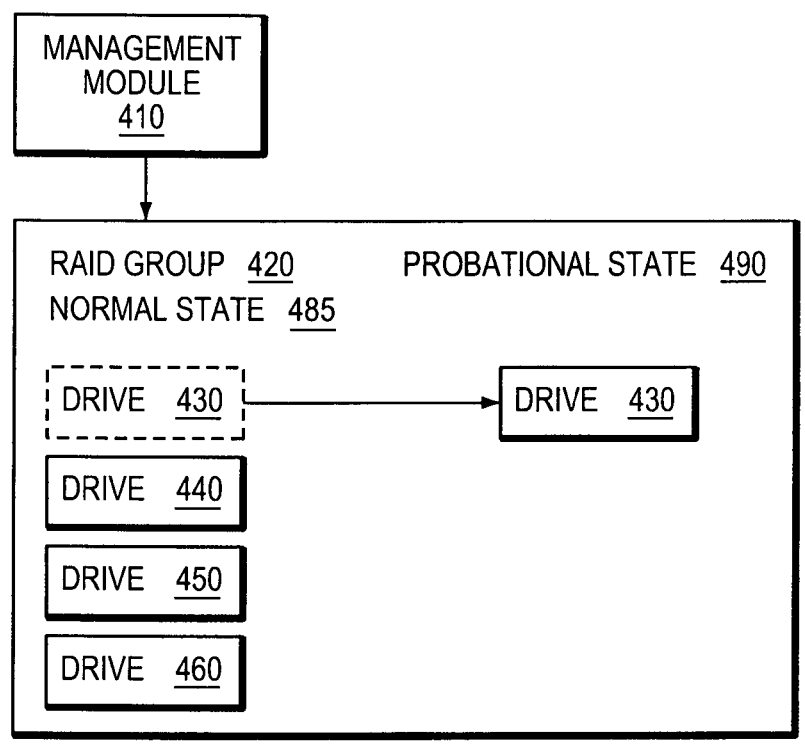
FIG. 4 is an alternative example of an embodiment of a RAID group that may utilize the techniques described herein.

Refer now to the embodiments of FIG. 3a and FIG. 4. In FIG. 4, a drive, drive 430, is put into probational state 490 from normal state 485 (step 315). In some embodiments, a drive may be placed in a probational state by sending a fault code to the drive. In certain embodiments, this fault code may enable the drive to be accessed so that the firmware may be upgraded but may not allow the drive to be accessed by I/Os. In further embodiments, the I/Os may be handled by the remaining drives in the RAID group.

Figure 5:
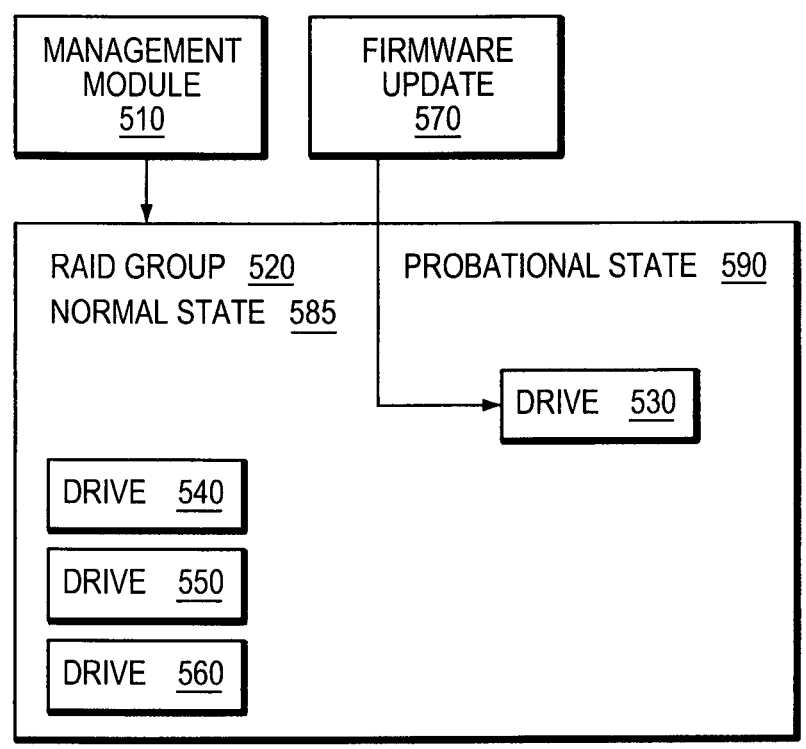
FIG. 5 is an example of an embodiment of a RAID group with a drive in a probational that may utilize the techniques described herein.

Refer now to the embodiments of FIGS. 5 and 3a. In FIG. 5, a Firmware 570 is applied to drive 530 while drive 530 is in probational state 590 (step 325). In some embodiments after the firmware update is applied, the drive may be rebooted several times. In certain embodiments, after the firmware has been applied the drive may be tested to ensure that the upgrade was successful.

Figure 6:
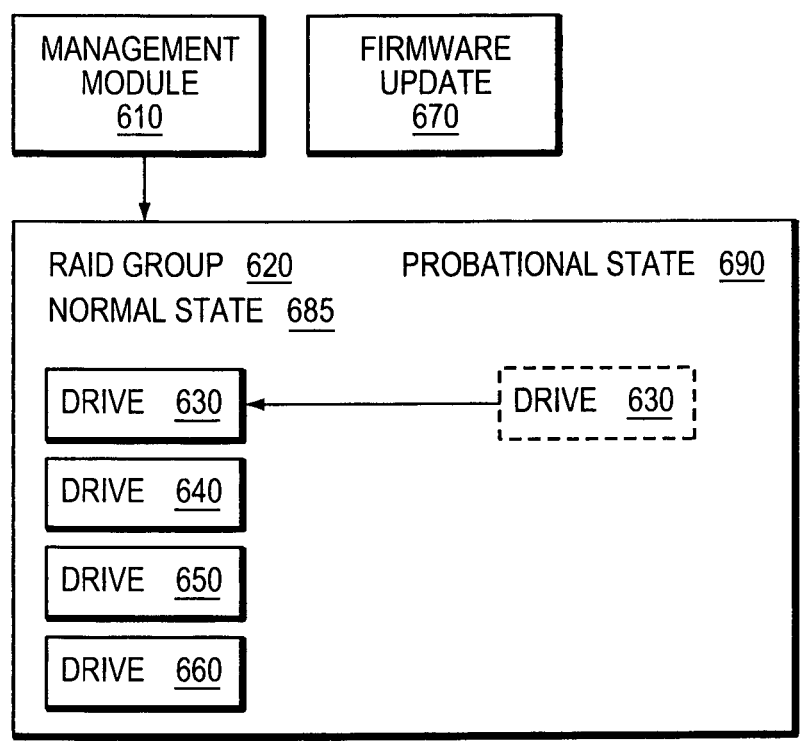
FIG. 6 is a further example of an embodiment of a RAID group that may utilize the techniques described herein.

Refer now to the embodiments FIG. 6 and FIG. 3a. In FIG. 6, drive 630, is put in normal state 685 from probational state 690 (step 230). In certain embodiments, following a drive being put into the normal state, any I/O logging or other actions performed by the other drives while the drive was in probational state may be transferred to the drive with the upgraded firmware. In further embodiments, any action needed to return the RAID group to normal functioning may be performed.

Figure 7:
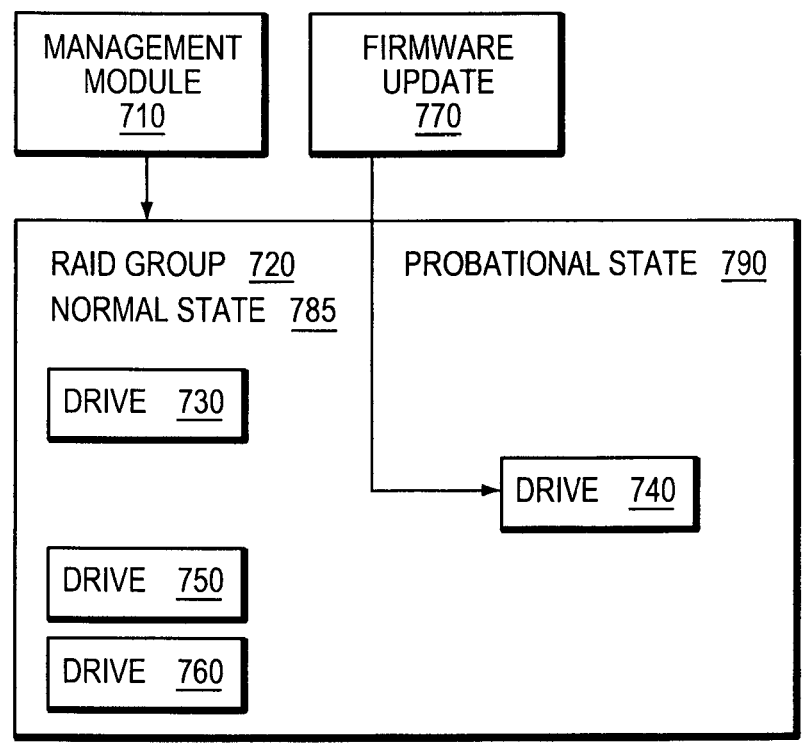
FIG. 7 is an example of an embodiment of a RAID group with a drive in a probational that may utilize the techniques described herein.
Figure 8:
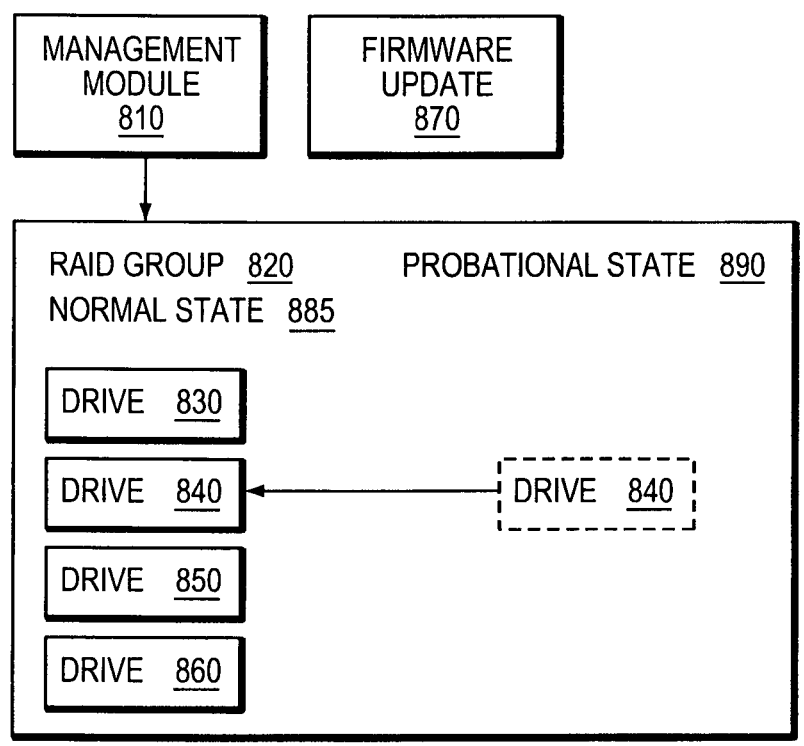
FIG. 8 is a further example of an embodiment of a RAID group that may utilize the techniques described herein.

Further refer to the embodiments of FIGS. 7 and 3a. In FIG. 7, drive 740 is put in probational state 790 and a firmware update is applied (steps 315 and 325). Refer now to the embodiments of FIG. 8 and FIG. 31. In FIG. 8, drive 840 is moved from probational state 890 into normal state 885. In further embodiments, each drive in the RAID group may be sequentially selected, put into a probational state, have the firmware upgrade applied, be tested, and returned to normal operating stated.

Figure 9:
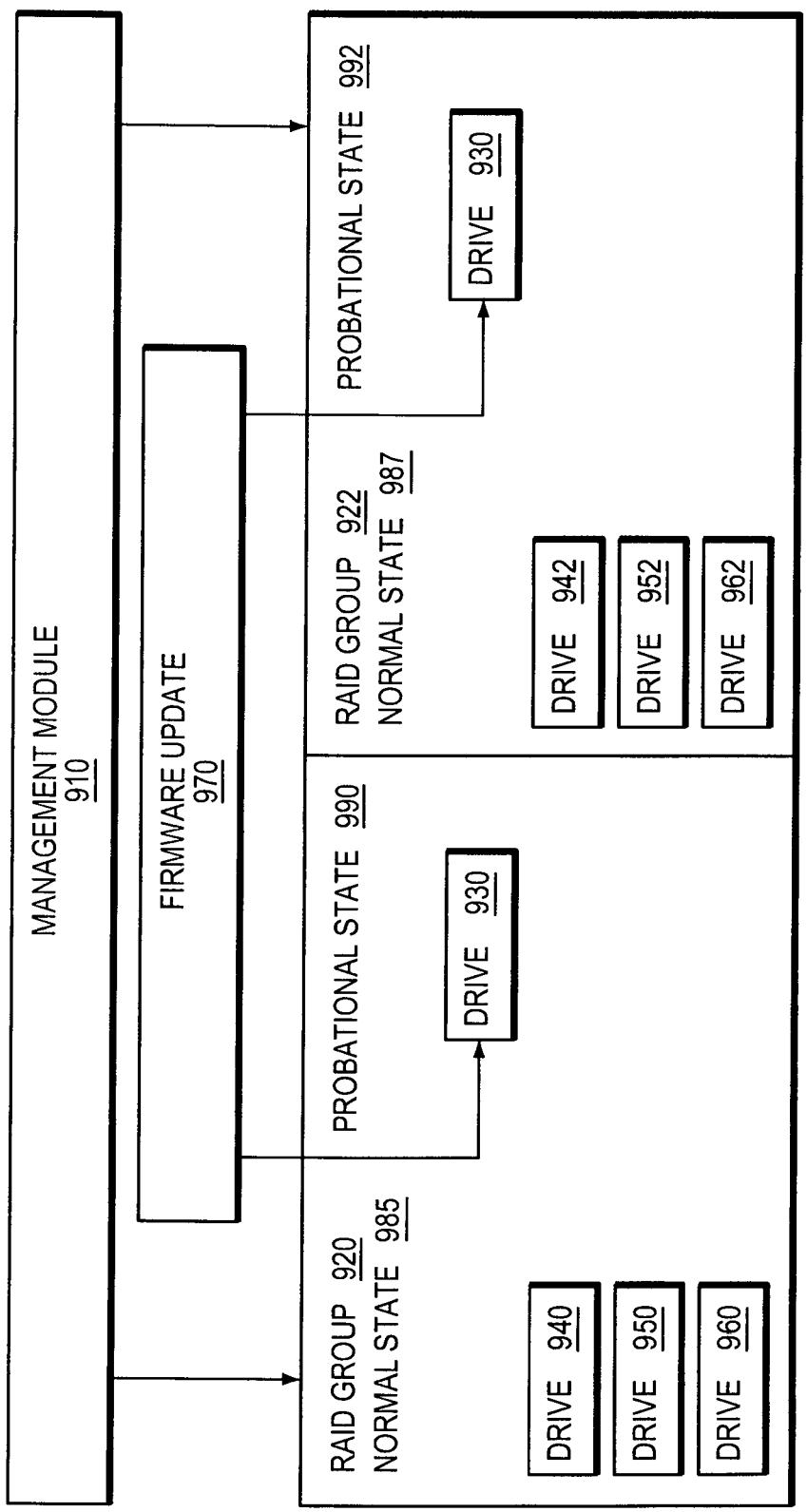
FIG. 9 is an example of an embodiment of a two RAID groups that may utilize the techniques described herein.

Refer now to the simplified embodiment of FIG. 9. In this embodiment, management module 910 is applying firmware updates to RAID groups 920 and 920 in parallel by applying the updates in serial to each drive in the respective RAID groups. In FIG. 9, the upgrade is being applied to two RAID groups, however it is envisioned that the drive upgrade may be applied to any number of RAID groups sequentially.

Figure 10:
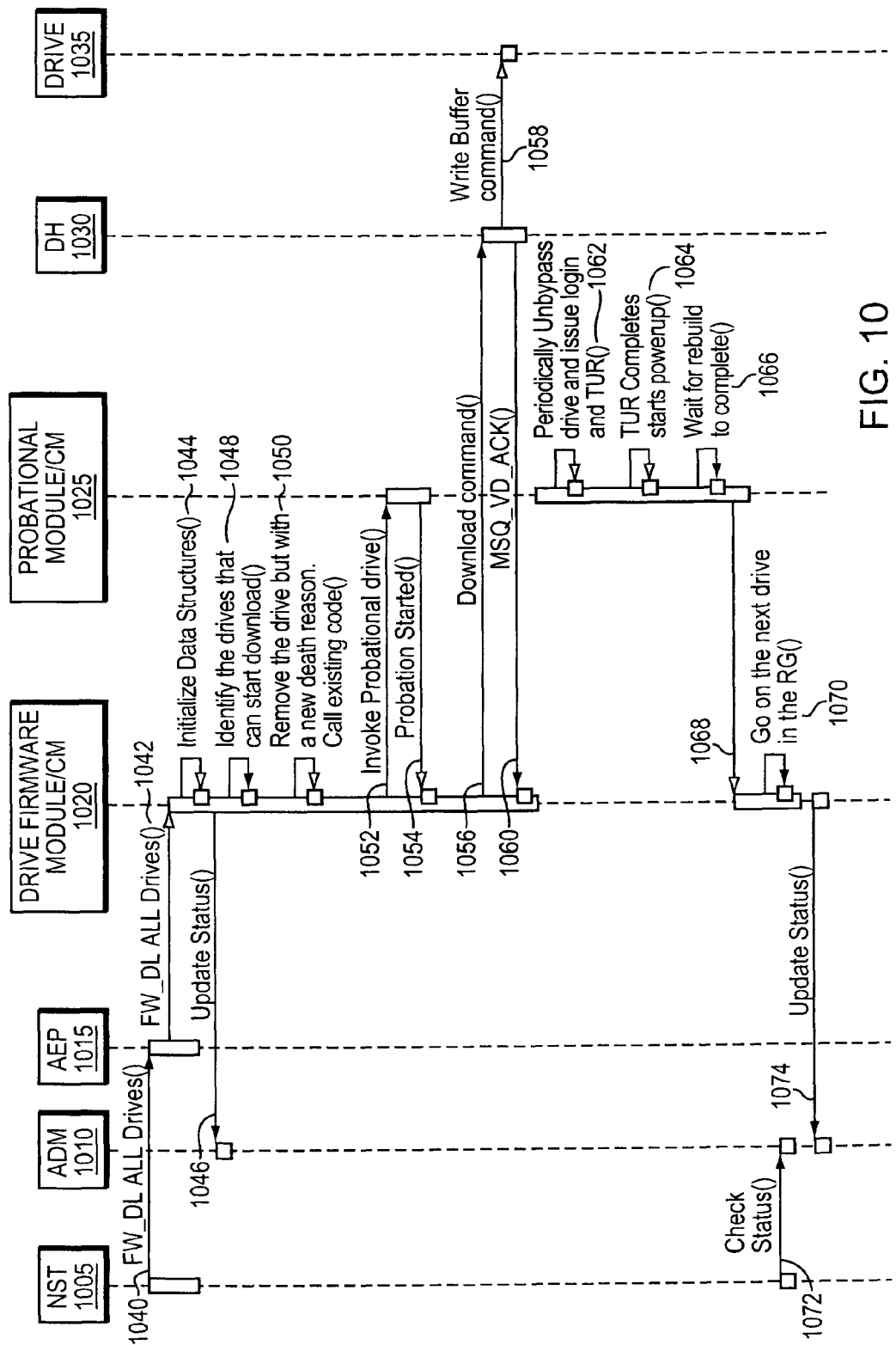
FIG. 10 example of an embodiment of a flow chart that may utilize the techniques described herein.

Refer now FIG. 10, which illustrates a simplified flow diagram of an embodiment of the current techniques. In this Figure, a Navisphere Service Tool (NST) 1005 may communicate with an Abnormal event processor (AEP) 1015, across an administrator (ADM) 1010. It may communicate to update the firmware in the RAID drives (step 1040). AEP 1015 may in turn communicate to Driver/Firmware Module (CM) 1020 to update the firmware (step 1042). This may initialize the data structures (step 1044). The Drive firmware module 1020 may communicate the update status (step 1046). The driver firmware module 1020 may identify the drives that can start the download (step 1048). The Driver Firmware module 1020 may remove the drive or drives to be updated with an error code (step 1050). This error code the drive Firmware Module 1020 may use may not be a death or failure code. The Drive Firmware Module 1020 may invoke a probational state to the probational module 1025 (step 1052). The Probational module 1025 may communicate the start of the probational state 1054.

The drive firmware module 1020 may communicate to the Drive Handler (DH) 1030 to start the download command (step 1056) The DH 1030 may communicate to the drive 1035 to write the buffer command to upgrade the firmware (step 1058). The DH 1030 may acknowledge the download (step 1060). The probational module 1029 may periodically ping the drive and issue a login command to power up the drive (step 1062). The drive may power up (step 1064). The probational module 1025 may wait for the drive to rebuild following the upgrade of the firmware (step 1066). The probational module 1025 may communicate that the firmware has been updated and the rebuild is complete to the data firmware module (step 1030). The Navisphere Service Tool 1005 may check the status of the upgrade (step 1072). The Drive Firmware module 1020 may update the states to the Administrator (step 1074). This embodiment of the current techniques may be iterated for each drive in a RAID group until all drives in the RAID group is upgraded. This embodiment may also be applied to multiple RAID groups in parallel.

Figure 11:
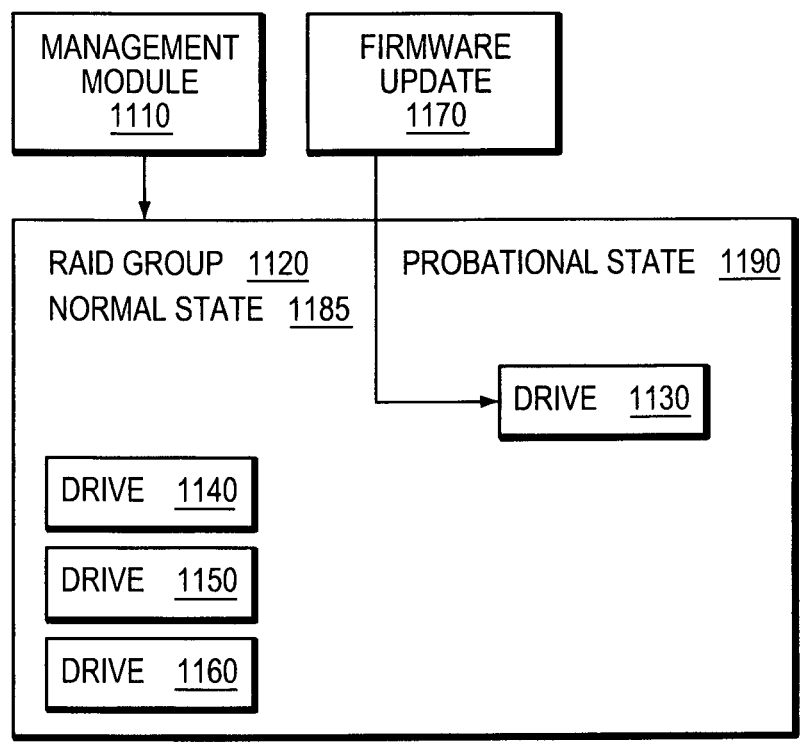
FIG. 11 is an example of an embodiment of a RAID group with a drive in a probational that may utilize the techniques described herein.
Figure 12:
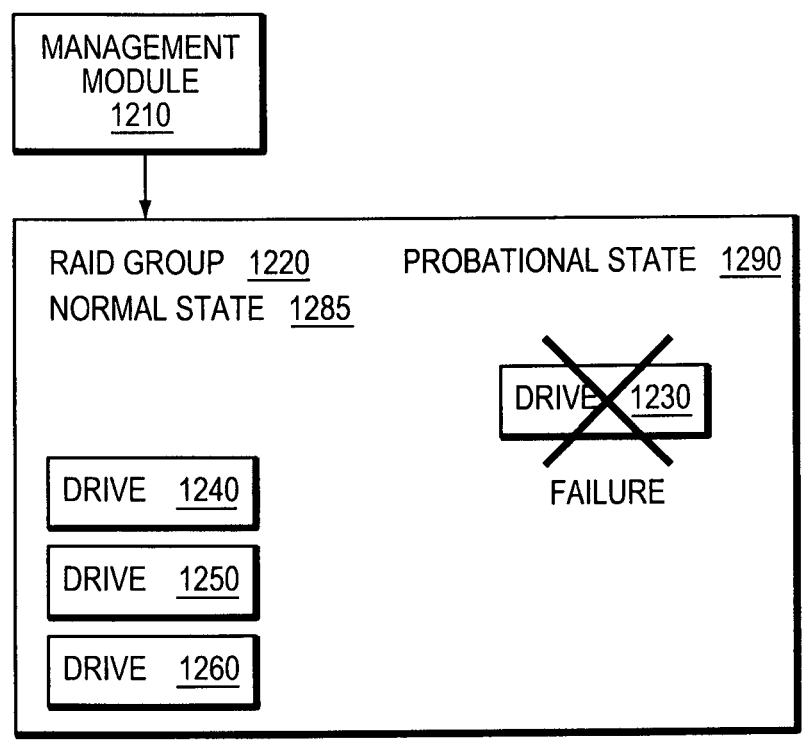
FIG. 12 is an example of an embodiment of a RAID group with a failed drive that may utilize the techniques described herein.
Figure 13:
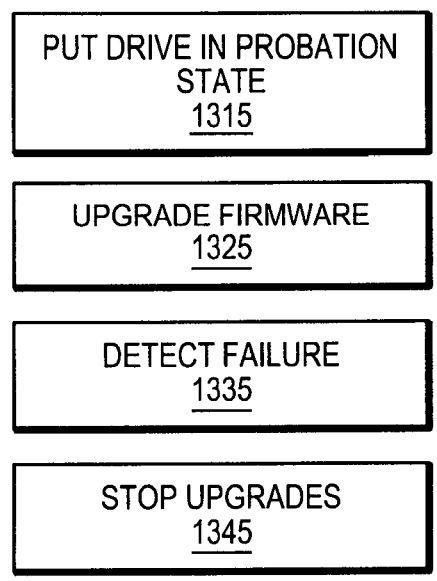
FIG. 13 is an example of an embodiment of a method that may utilize the techniques described herein.

Refer now to the embodiments of FIG. 11-13. The embodiments of FIGS. 11 and 13 illustrate a drive 1130 which has been put in probational state 1190 and which a firmware upgrade 1170 has been applied (Steps 1315 and 1325). The embodiments of FIGS. 12 and 13 illustrate a drive 1230 where a failure of the firmware has been detected and the upgrades on the other drives are not completed (steps 1335 and 1345). Previously, in a typical upgrade, all the drive may have been brought offline and the firmware updated on all drives. Conventionally, if a firmware update failed, then all the drives would be inaccessible and this could lead to data unavailability or data loss. Conversely, in some embodiments of the claimed invention, such as the embodiments of FIGS. 11-13, a failed upgrade may be realized and not applied to all the drives. At least some of these embodiments may enable continued data availability and no data loss as the rest of the RAID group may satisfy the I/O. In further embodiments, when the system is notified of the failed drive, it may be replaced to restore the RAID group to full functionality.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Figure 14:
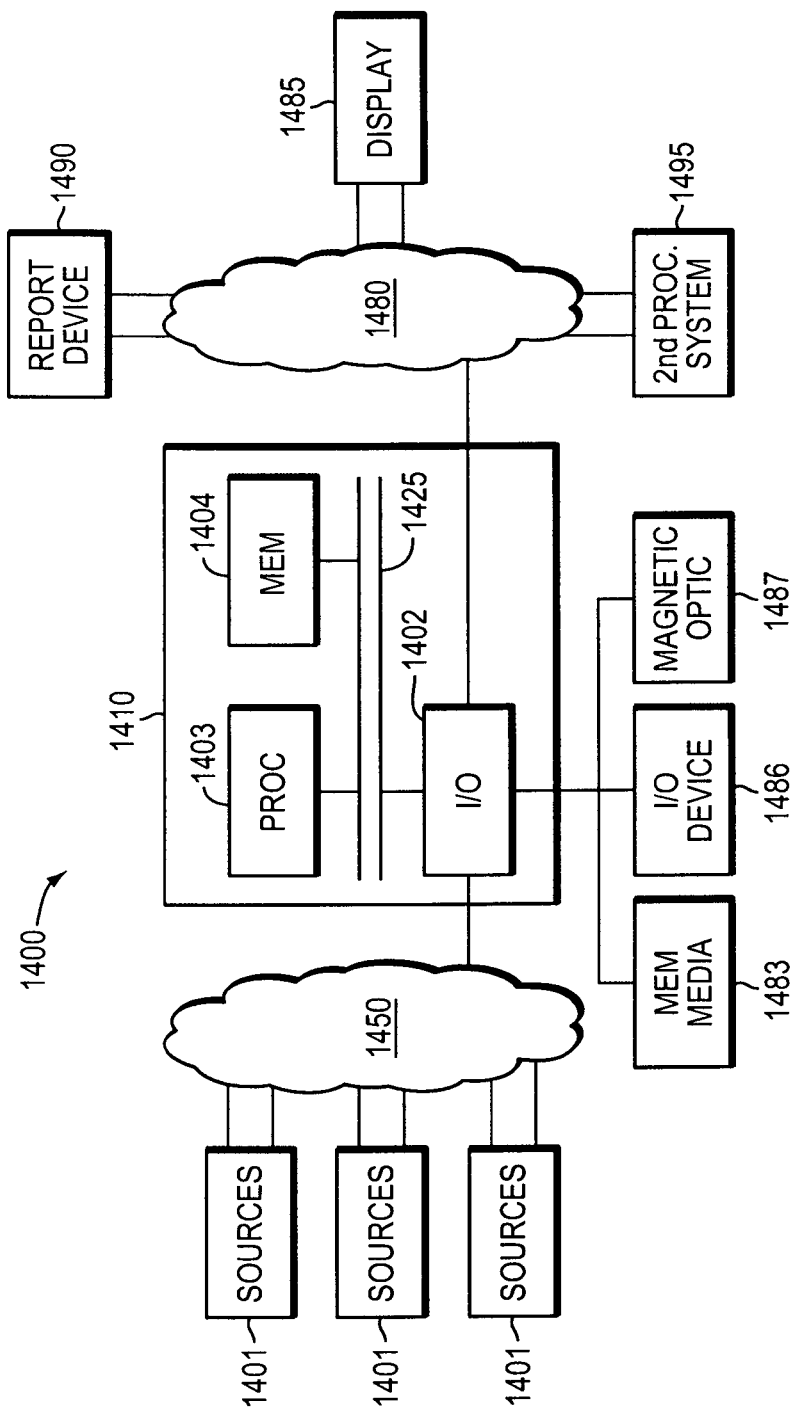
FIG. 14 is an example of an embodiment of an apparatus that may utilize the techniques described herein.
Figure 15:
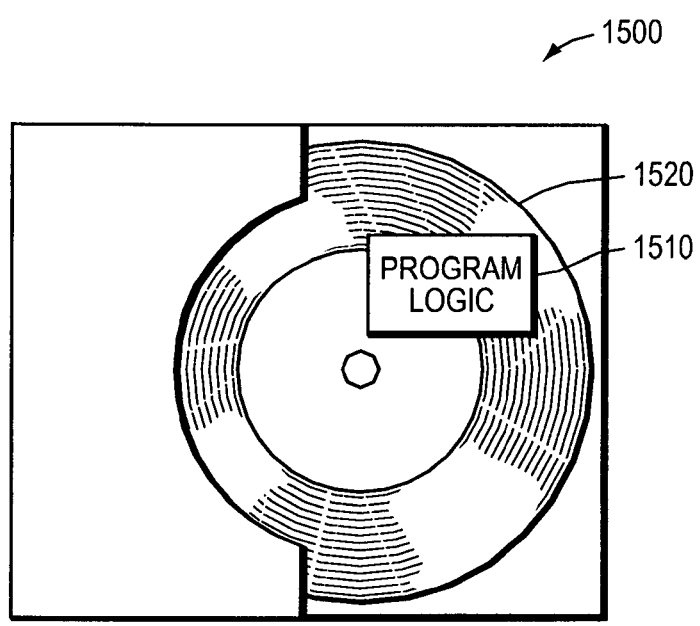
FIG. 15 is an example of an embodiment of a method embodied on a computer readable storage medium that may utilize the techniques described herein

An embodiment may implement the techniques herein using code executed by a computer processor. For example, the methods and apparatus of this invention may take the form, at least partially, of a computer program product or program code (i.e., instructions) embodied in tangible or non-transient media, such as floppy diskettes, CD-ROMs, hard drives, random access or read only-memory, or any other machine-readable storage medium. When the program code is loaded into and executed by a machine, such as the computer of FIG. 14, the machine becomes an apparatus for practicing the invention. When implemented on one or more general-purpose processors, the program code combines with such a processor to provide a unique apparatus that operates analogously to specific logic circuits. As such a general purpose digital machine can be transformed into a special purpose digital machine. FIG. 15 shows Program Logic 1530 embodied on a computer-readable medium 1530 as shown, and wherein the Logic is encoded in computer-executable code configured for carrying out the reservation service process of this invention and thereby forming a Computer Program Product 1500.

The logic for carrying out the method may be embodied as part of the aforementioned system, which is useful for carrying out a method described with reference to embodiments shown in, for example, FIG. 3a. For purposes of illustrating the present invention, the invention is described as embodied in a specific configuration and using special logical arrangements, but one skilled in the art will appreciate that the device is not limited to the specific configuration but rather only by the claims included with this specification. As will be appreciated by those skilled in the art, the code may be stored on the data storage system on any one of a computer-readable medium having any one of a variety of different forms including volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can accessed by a data storage system processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in upgrading disk drive firmware in a data storage environment, the method comprising:
    selecting a first physical disk from a set of physical disks, the first physical disk having firmware; wherein the set of physical disks are mapped to a set of logical disks; wherein the mapping of the set of physical disks to the set of logical disks includes a redundant array of inexpensive disks (RAID) system;
    removing the first physical disk; wherein based on the RAID system, removal of the first physical disk is transparent to input/output (I/O) on the set of logical disks;
    upgrading the firmware of the first physical disk while allowing I/O access to the set of logical disks; wherein the allowed I/O access occurs on the set of logical disks while the first physical disk is removed, wherein the allowed I/O includes reads and writes on the set of logical disks;
    wherein the data storage environment is enabled to determine if the upgrading of the firmware of the first physical disk was successful; and
    based a negative determination, marking the firmware upgrade of the first physical disk as bad to inhibit an upgrade of firmware of other drives.

2. The method of claim 1 further comprising:
    based a positive determination, selecting a second physical disk of the set of physical disks;
    removing the second physical disk; wherein removal of the second physical disk is transparent to I/O to the set of logical disks; and
    upgrading firmware on the second physical disk while allowing I/O access on the set of logical disks.

3. The method of claim 1 wherein the first physical disk is removed by sending a fault to the first physical disk.

4. The method of claim 1 wherein a management module identifies the set of physical disks.

5. The method of claim 1, further comprising:
    communicating a fault code to the first physical disk; wherein the fault code puts the first physical disk in a probational state.

6. The method of claim 5 wherein the firmware of the first physical disk is enabled to be upgraded while in the probational state.

7. The method of claim 6 wherein the fault code is a probational fault code.

8. A computer program product, stored on a tangible non-transitory computer readable medium for use in upgrading disk drive firmware in a data storage environment, the computer program product containing logic enabling a processor to execute:
    selecting a first physical disk from a set of physical disks, the first physical disk having firmware; wherein the set of physical disks are mapped to a set of logical disks; wherein the mapping of the set of physical disks to the set of logical disks includes a RAID system;
    removing the first physical disk; wherein based on the RAID system, removal of the first physical disk is transparent to I/O on the set of logical disks;
    upgrading the firmware of the first physical disk while allowing I/O access to the set of logical disks; wherein the allowed I/O access occurs on the set of logical disks while the first physical disk is removed, wherein the allowed I/O includes reads and writes on the set of logical disks;
    wherein the data storage environment is enabled to determine if the upgrading of the firmware of the first physical disk was successful; and
    based a negative determination, marking the firmware upgrade of the first physical disk as bad to inhibit an upgrade of firmware of other drives.

9. The computer program product of claim 8 wherein the logic further enables:
    based a positive determination, selecting a second physical disk of the set of physical disks;
    removing the second physical disk; wherein removal of the second physical disk is transparent to I/O to the set of logical disks; and
    upgrading firmware on the second physical disk while allowing I/O access on the set of logical disks.

10. The computer program product of claim 8 wherein the logic enables the first physical disk to be removed by sending a fault to the first physical disk.

11. The computer program product of claim 8 wherein the logic enables a management module to identify the set of physical disks.

12. A system for use in upgrading disk drive firmware in a data storage environment, the system comprising:
    a firmware upgrade;
    a set of physical disks mapped to a set of logical disks; wherein the mapping of the physical disks to the set of logical disks includes a RAID system;
    computer-executable program code operating in memory, wherein the computer-executable program code is configured to enable execution of:
    selecting a first physical disk from the set of physical disks, the first physical disk having firmware;
    removing the first physical disk; wherein based on the RAID system, removal of the first physical disk is transparent to I/O on the set of logical disks; and
    upgrading the firmware of the first physical disk with the firmware upgrade while allowing I/O access to the set of logical disks; wherein the allowed I/O access occurs on the set of logical disks while the first physical disk is removed, wherein the allowed I/O includes reads and writes on the set of logical disks;

wherein the data storage environment is enabled to determine if the upgrading of the firmware of the first physical disk was successful; and based a negative determination, marking the firmware upgrade as bad to inhibit an upgrade of firmware of other drives.

13. The system of claim 12 the computer-executable program code further enables:

based a positive determination, selecting a second physical disk of the set of physical disks;

removing the second physical disk; wherein removal of the second physical disk is transparent to I/O to the set of logical disks; and upgrading firmware on the second physical disk while allowing I/O access on the set of logical disks.

14. The system of claim 12 wherein the computer-executable program code enables the first physical disk to be removed by sending a fault to the first physical disk.

15. The system of claim 12 wherein the computer-executable program code enables a management module to identify the set of physical disks.

* * * * *